United States Patent [19]
Morse

[11] Patent Number: 5,033,258
[45] Date of Patent: Jul. 23, 1991

[54] POWER LAWN MOWER ASSEMBLY AND SYSTEM FOR SUPPORTING BAG THEREON

[75] Inventor: Richard R. Morse, Sheboygan Falls, Wis.

[73] Assignee: Lawn-Boy Inc., Plymouth, Wis.

[21] Appl. No.: 483,920

[22] Filed: Feb. 23, 1990

[51] Int. Cl.⁵ .................... A01D 34/70; B65D 33/16
[52] U.S. Cl. ........................ 56/202; 383/16; 383/41
[58] Field of Search ............ 56/16.16, 202, 203, 56/204, 206, 205, 320.1; 383/16, 21, 41, 34, 67, 906

[56] References Cited

U.S. PATENT DOCUMENTS

| | | | |
|---|---|---|---|
| 2,910,818 | 11/1959 | Beal et al. | 56/320.2 |
| 3,393,500 | 7/1968 | MacLeod et al. | 56/202 |
| 3,568,421 | 3/1971 | Smith et al. | 56/255 |
| 4,103,478 | 8/1978 | Schaefer | 56/205 |
| 4,126,986 | 11/1978 | Kidd | 56/202 |
| 4,149,362 | 4/1979 | Haffner et al. | 56/202 |
| 4,175,603 | 11/1979 | Iaboni et al. | 56/202 X |
| 4,214,424 | 7/1980 | Gobin | 56/202 |
| 4,258,538 | 3/1981 | Morse | 56/202 |
| 4,312,176 | 1/1982 | Bollinger et al. | 56/202 |
| 4,344,274 | 8/1982 | Heismann | 56/202 |
| 4,846,588 | 7/1989 | Allen et al. | 56/202 X |

OTHER PUBLICATIONS

Lawn Boy Leaflet on 1987 Lawn Boy, 1986.
Lawn Boy Leaflet, "Installation Instructions for 683788 and 683789", , 3/1990.

Primary Examiner—Ramon S. Britts
Assistant Examiner—David J. Bagnell
Attorney, Agent, or Firm—Synnestvedt & Lechner

[57] ABSTRACT

A mower assembly comprising a grass-catcher bag having an inlet connector for mounting its inlet to the outlet of the mower's grass-discharge outlet, and having a bag-mouth closure at its opposite end mounted on the mower handle. The inlet connector is of a type which slides vertically in and out of its mounted positions, and the rear support for the bag-mouth closure includes an upwardly facing channel, in which lateral ears of the closure rest. A front handle is provided on the bag-inlet connector and a rear handle on the bag-mouth closure, whereby the bag can be removed and replaced easily by simultaneous vertical motion of the two handles.

9 Claims, 3 Drawing Sheets

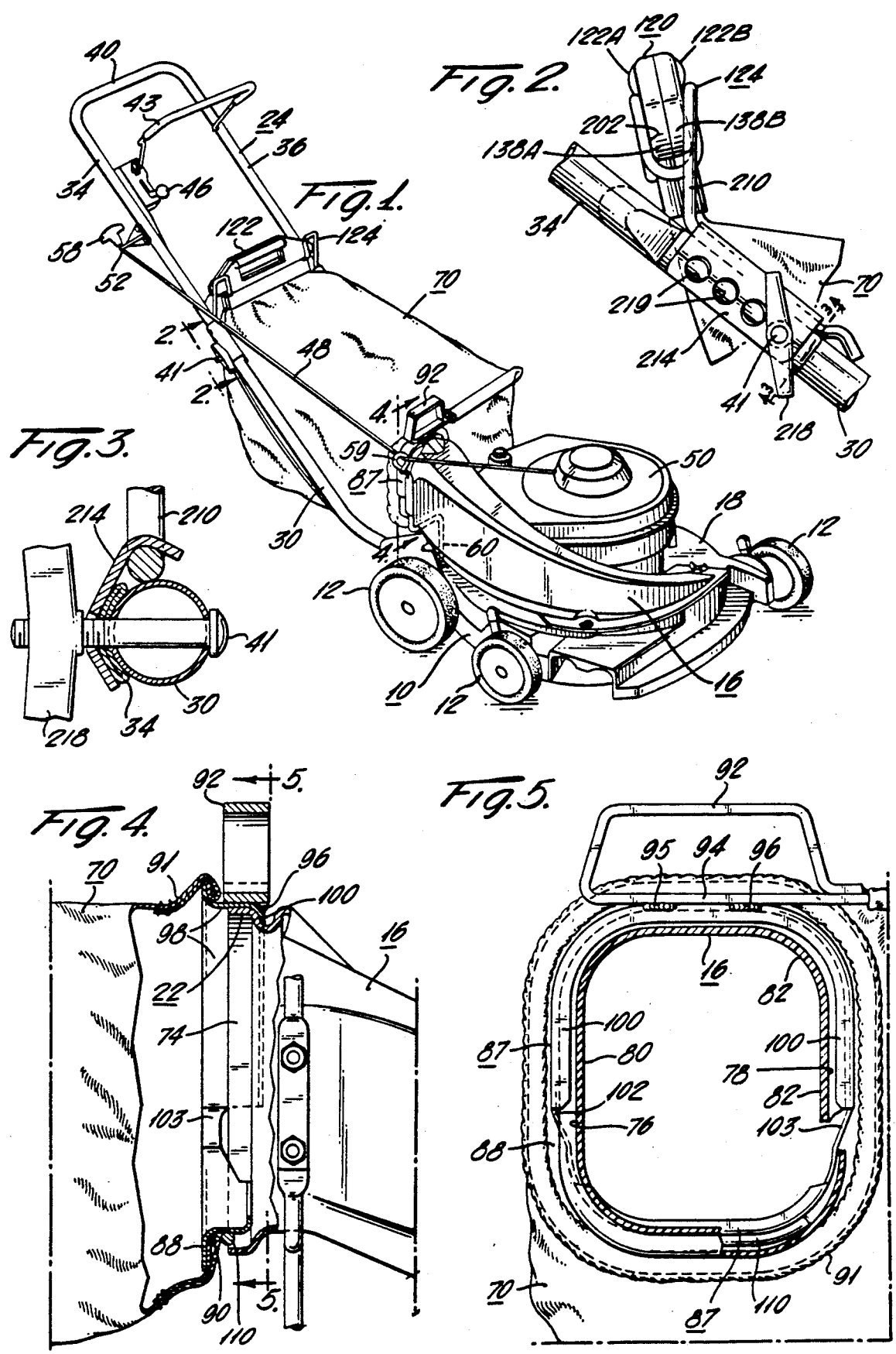

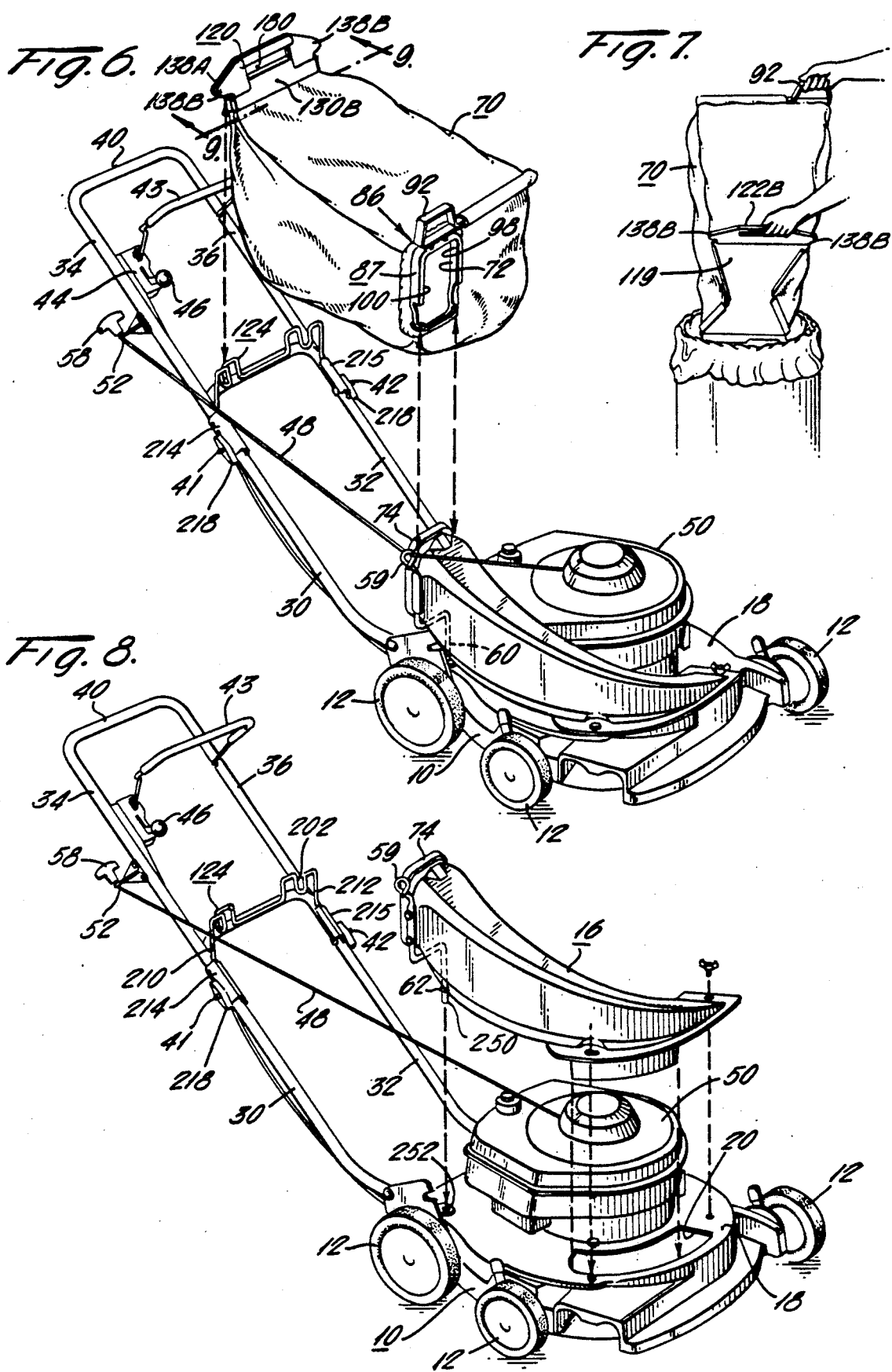

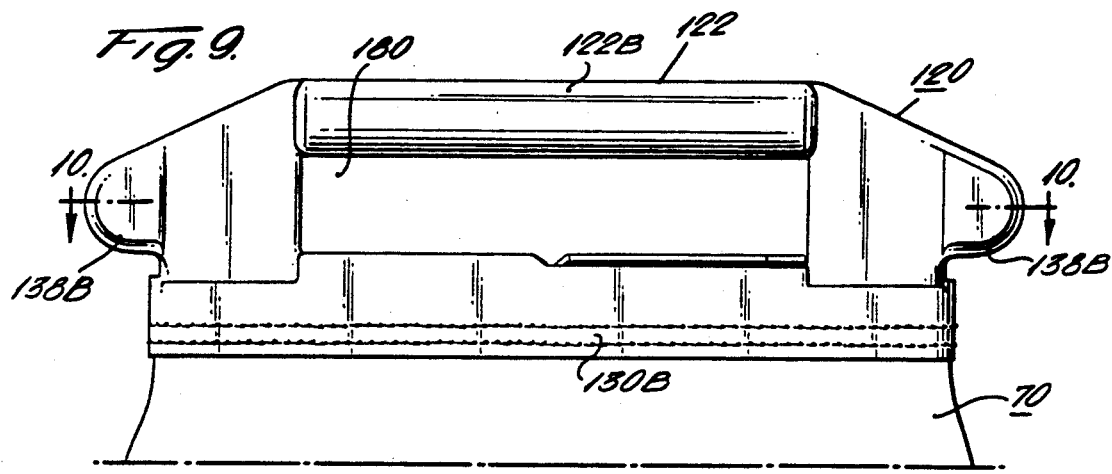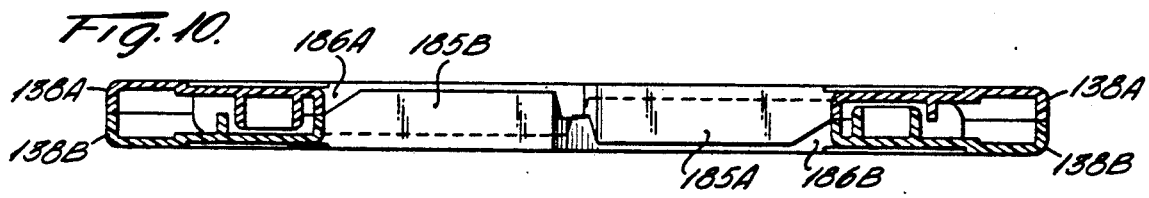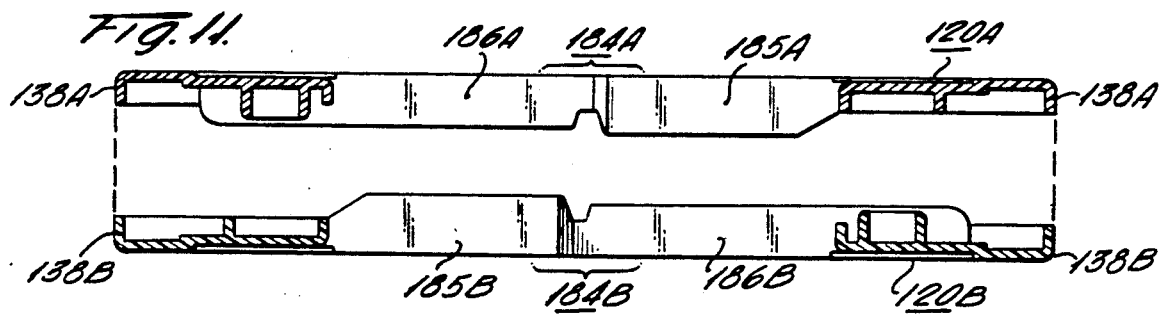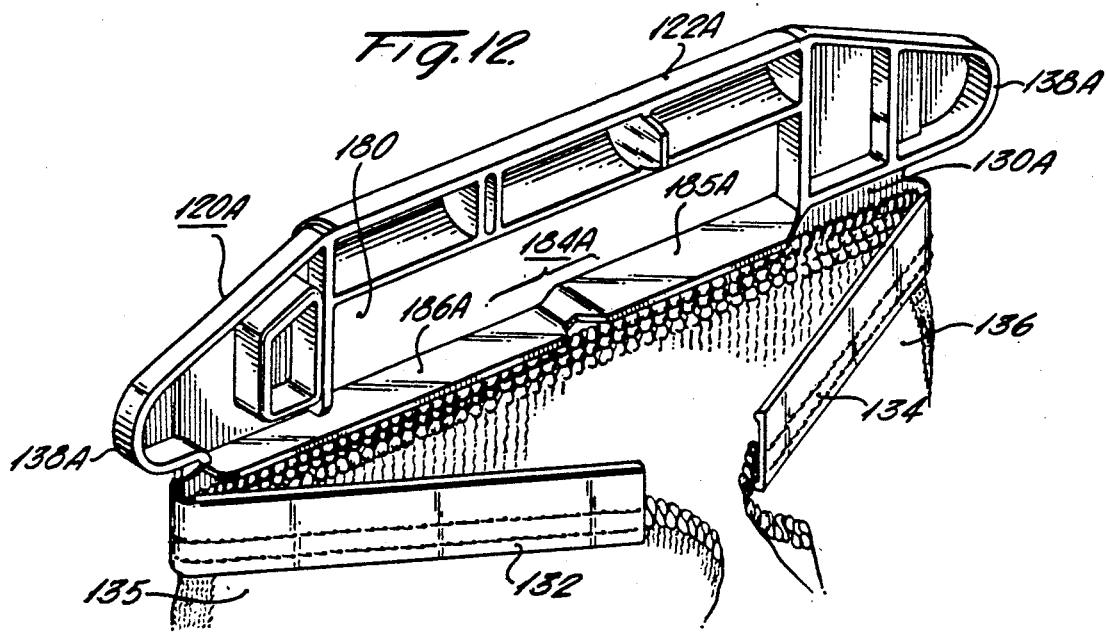

POWER LAWN MOWER ASSEMBLY AND SYSTEM FOR SUPPORTING BAG THEREON

FIELD OF THE INVENTION

This invention relates to power lawn mower assemblies, and especially to systems for supporting on the mower assembly a bag for receiving cuttings discharged by the cutting blade of the mower.

BACKGROUND OF THE INVENTION

In previously known types of power lawn mowers, it is common to support on the mower a bag for receiving cuttings produced by the cutting blade of the mower, as they are discharged from the discharge chute. This bag, commonly called a grass bag, is typically removable and replaceable, so that when it is to be emptied it can be taken from the mower, its contents dumped, and the emptied bag returned to the mower for further use. In one popular form of such mower assembly, the bag is mounted directly rearwardly of the engine and cutter blade to provide balance and symmetry, as opposed to mounting the bag so that it extends outwardly from a side of the mower assembly and tends to produce imbalance and lack of symmetry. Such imbalance may be particularly disadvantageous when using the mower on side slopes, and the lack of symmetry may present a problem in that mowing close to the edges of objects is somewhat more difficult when the mower is operated so that the bag moves along the edges of adjacent objects.

Typically, power lawn mower assemblies of the prior art have mounted the grass bag in a manner which makes it somewhat awkward or difficult to accomplish its removal and replacement. For example, mounting or demounting of one or both ends of the bag from its supports typically requires operations of some special latching mechanisms, and/or sideways pushing, pulling or extension of the bag.

An object of the present invention is to provide a new and improved power mower assembly, and a new and improved arrangement for mounting the grass bag thereof on a lawn mower for ready removal and replacement.

A further object is to provide such assembly and arrangement in which removal of the bag may be accomplished by directly-upward, simultaneous lifting of handles located at opposite ends of the bag.

Another object is to provide such a system and bag support arrangement in which the bag can be replaced by vertical downward motion of the same two handles.

Still another object is to provide such an assembly and bag support arrangement which does not require operation of any latching or unlatching mechanisms, or any sideways motion of the bag, in odder to accomplish removal and replacement thereof.

A further object is to provide such an assembly and bag support arrangement which is simple and inexpensive, and easy to install and use.

SUMMARY OF THE INVENTION

These and other objects of the invention are achieved by the provision, in such a lawn mower assembly, of an improved system for mounting one end of the grass bag inlet on the discharge outlet of the discharge chute of the mower and the other end on the mower-control handle. The system is of the type which comprises a bag-inlet connector for connecting the bag inlet to the discharge chute outlet, and a bag-mouth closure means at the rearward end of the bag. A front handle is provided on the bag inlet connector, and a rear handle is provided on the bag mouth closure means, the construction being such that the bag can be removed by direct, vertically-upward lifting of both handles simultaneously, and can be replaced by a vertically-downward motion of the handles. The bag mouth closure means is preferably such that, when permitted to hang downwardly after removal of the bag, it opens automatically and permits the bag contents to empty by gravity.

Accordingly, without requiring any operation of latches or connectors, and without requiring any sideways motions of the bag or its connectors, bag removal can be accomplished in the simplest and most efficient manner, i.e., by mere simultaneous upward lifting of two handles; the "drop-in" replacement of the bag is similarly very simple and efficient.

Preferably, the rear handle is integral with the closure means for the mouth of the bag and is in two parts, each of which is secured to one of a pair of opposite panels of the bag mouth; each of the two parts of the rear handle is provided with a pair of laterally-outwardly extending ears, which nest in an upwardly-facing channel mounted between opposite arms of the mower handle to enable the above-described vertical motion of the bag during removal and replacement. The two parts of the rear handle are preferably mirror images of each other, and each is preferably provided along part of its length with a flange which overlies a portion of the other handle part when the two parts are brought into close contact with each other, thus providing a seal against egress of grass in the bag. The upwardly-facing channel for supporting the rear handle is preferably provided by a convoluted rod having end portions secured to opposite arms of the mower handle, the positions of its attachment to the handle preferably being adjustable to accommodate tolerances in the size and design of the bag and handle. The bag inlet connector to which the front handle is secured slides vertically into and out of sealed position on the discharge chute outlet connector, for easy vertical removal and replacement.

Accordingly, there has been provided a power lawn mower system and bag support arrangement which enables extremely easy and efficient removal, emptying and replacement of the bag, using apparatus which is easy to assemble and inexpensive yet effective for its purposes, and which provides excellent sealing of the bag mouth when in place on the mower.

BRIEF DESCRIPTION OF FIGURES

Other objects and features of the invention will be more readily understood from a consideration of the following detailed description, taken with the accompanying drawings, in which;

FIG. 1 is a perspective view of a complete power lawn mower assembly embodying the present invention in its preferred form;

FIG. 2 is a fragmentary side view taken along lines 2—2 of FIG. 1.

FIG. 3 is a fragmentary cross-sectional view taken along lines 3—3 of FIG. 2.

FIG. 4 is a fragmentary side elevation view taken along lines 4—4 of FIG. 1;

FIG. 5 is a cross-sectional view taken along lines 5—5 of FIG. 4;

FIG. 6 is a perspective view similar to FIG. 1, but showing the grass bag lifted vertically from its position on the lawn mower;

FIG. 7 is a perspective view illustrating the manner in which the bag may be emptied into a container after removal from the lawn mower;

FIG. 8 is a perspective view of the mower FIG. 1 less the bag, and showing the grass discharge chute elevated from its mounted position to illustrate the manner of its mounting;

FIG. 9 is a fragmentary view taken along lines 9—9 of FIG. 6;

FIG. 10 is a sectional view taken along lines 10—10 of FIG. 9;

FIG. 11 is a sectional view similar to that of FIG. 10, showing the two parts or halves of the bag mouth closure means, separated from each other; and FIG. 12 is a perspective view of one half of the bag-mouth closure means, in position on the bag.

DETAILED DESCRIPTION OF SPECIFIC EMBODIMENTS

Referring now to the preferred embodiment of the invention shown in the drawings by way of example only, and without thereby in any way limiting the scope of the invention, a power lawn mower assembly is shown in FIG. 1 which comprises a chassis 10 mounted on wheels such as 12, on which chassis the motor and rotary cutting blade (not shown) are mounted in the usual way. A rearwardly discharging chute 16 is mounted on the top of the blade-covering deck 18 and receives the discharge of grass and air through top opening 20 (see FIG. 8) in the deck and discharges it rearwardly through discharge outlet opening 22 (FIG. 4).

A pair of forward mower-handle arms 30 and 32 are pivotably secured to the rear of the chassis (See FIG. 6), and these forward arms are secured to a pair of respective rearward mower-handle arms 34 and 36 joined to each other by an integral end piece 40; the forward and rearward mower-handle arms may be secured to each other by a pair of pivot screws 41 and 42 (FIGS. 3 and 8) which, when loosened, permit folding up of the rearwardly-extending arms with respect to the forward arms, and then folding up of the forward arms with respect to the chassis, for convenient compacting of the entire assembly to facilitate its transport, for example for taking it in the trunk of an automobile to another mowing location or to a repair location.

As is conventional, a pivoted control bar 43 also extends between the rearward arms of the handle, and is associated with a control box 44 and a control 46 for controlling the application of power to the driving wheels of the mower and to the cutting blade. A usual starter rope 48 is also provided, extending from the interior of the motor housing 50 through the handle-mounted eyelet 52 to the starter handle 58, which rope can be pulled to effect starting of the engine. The starting rope also passes through an eyelet 59, which is preferably mounted to the exterior of the discharge chute and from which there extends downwardly a rod 60 for supporting the rearward end of the chute; to assist in this, the lower end of the rod 60 is provided with a flange 62 (FIG. 8) spaced somewhat backward from its end and which bears against the top of the deck 18 to provide the desired chute support.

The grass bag 70 is provided for receiving and collecting cuttings produced by the cutter blade as they are discharged from chute 16. It is preferably made of conventional flexible material, such as a woven plastic fabric.

The present invention is concerned primarily with the manner which the forward and rearward ends of the bag are mounted on the lawn mower assembly, as will now be described.

Referring first to the front end of the bag 70, there is provided a bag inlet opening 72 having a shape generally similar to that of the discharge opening 22 of discharge chute 16. The outlet end of discharge chute 16, which may be of rigid plastic, is provided with an integral sealing flange 74 completely circumscribing the chute outlet opening; just forward (toward the engine) of the flange 74 a pair of vertically extending grooves 76 and 78 are formed in the outer walls of the chute, which extend also along the top of the chute. The top of flange 74 is substantially flat at center, and rounded at its corners to merge with the substantially straight-sided portions thereof. Inside the chute, and just inwardly of the flange 74, there are provided inwardly radially-extending vertical ridges 80 and 82. This configuration of the flanges and of the outlet end of the discharge chute constitute an integral chute outlet connector to which the bag inlet connector 86 (FIG. 6) can be assembled by relative vertical motion with respect to the chute outlet as will now be described.

Referring now particularly to FIGS. 4, 5 and 6 for specific details of the bag inlet connector 86, this comprises generally a ring 87 having a flange 88 extending radially outwardly at its rearward side, and about which the inlet of the bag is tightly secured by means of an elastic band 90 within a hem 91 surrounding the bag inlet opening, as shown for example in FIG. 4. This provides the desired sealed connection between the bag inlet connector and the bag inlet itself. Secured to the top of the bag inlet connector is a handle 92 from which extends a rigid horizontal strip 94 about which the remainder of the top front edge of the bag is secured by appropriate hemming, thereby to support the front end of the bag in operating position. The connector and the handle may, for example, be of metal, and the two parts welded to each other, as at 95, 96 (FIGS. 4 and 5).

The main body of the bag inlet connector 86 comprises the annular portion 87 having an inside surface approximately the upper half of which fits snugly against the exterior of the top and vertical sides of the flange 74 of the discharge chute outlet connector means; the annular portion 87 of the bag inlet connector is provided with a distal, radially-inwardly turned flange 100 running along its top and part way down each of its sides, in a position so that it extends within the grooves 76, 78 of the chute outlet connector whereby, when assembled, the bag inlet connector cannot be pulled forwardly from its position on flange 74 of the discharge chute. Ring 87 also includes a center portion 98 connecting flanges 100 and 88. During assembly, the bag inlet connector is slid vertically downward over flange 74 until the underside of its top rests against the top of flange 74, the top of the outlet end of the discharge chute and the top of the inlet end of the bag thereby being held in sealed relationship, as desired.

In order to permit the bag inlet connector to slide into the position described, a portion of ring 87 and of flange 100 near the bottom of each side is cut away, in this example from points 102, 103 on its vertical side walls to, and completely around, the bottom thereof. This permits the upper end of the flange 74 to be inserted inside of the flange 100 and ring 87 on the upper portion of the bag inlet connector, when assembling the two parts together.

To complete the sealing of the discharge opening to the bag inlet opening, the lower part of the bag inlet connector is of lesser width than the upper part of, so that as the flange 74 of the discharge chute slides inside of ring 87, as described previously, the lower portion of the bag inlet connector will fit inside the flange 74 of the discharge chute; the lower end of the bag inlet connector is contoured to fit tightly, when in its lowermost position, against the bottom portions of the discharge chute to provide an appropriate seal. In the present embodiment, to enhance the seal between the lower end of the discharge chute and the bag inlet opening, a rod 110 is welded to the underside of the bag inlet connector, and is contoured to fit accurately against the lower interior surface of the flange 74 of the discharge chute connector. This rod also secures the elastic ban 90 and hem 91 from pulling away from the bag inlet connector flange 88.

Accordingly, by pulling upward on handle 92, the bag inlet connector easily slides upwardly to disconnect it from the discharge chute connector, and the two connectors can be reassembled merely by letting the bag inlet connector drop into place, with only slight downward guidance. No clamping, unclamping, latching or unlatching or side ways motions are required for this removal and replacement.

Turning now to the structure of the support for the opposite end of the bag, the mouth 119 of the bag is shown open in FIG. 7, while in the other figures it is shown in its closed position. The configuration of this rearward end of the bag, and the manner in which it is cut and stitched to fold up appropriately, may be substantially as set forth in Morse, U.S. Pat. No. 4,258,538, and need not be described here in detail. In the present invention, the important aspects are the configuration and operation of the bag mouth closure means 120, its associated handle 122 and the support 124 for the closure and handle, as will now be described.

Bag closure means 120 in this example comprises two parts 120A and 120B (FIG. 11), which are mirror images of each other and fit together to close the bag. Each part is sewn to one side of the bag mouth so that when the two parts are together, the mouth is closed. The portion of the closure which is secured to the bag may be similar to that described in the above-identified Morse patent, particularly with respect to the transverse lower ribs 130A and 130B to which opposite panels of the bag mouth are sewn, and with respect to the two foldable tabs such as 132, 134 extending respectively from opposite ends of each rib and to which foldable panels such as 135, 136 of the bag are sewn, and the integral half-handles 122A, 122B. The present closure arrangement differs notably from the Morse construction with particular respect to the provision of the pairs of outwardly-extending ears 138A on handle part 122A and similar laterally-extending ears 138B on handle part 122B, and with respect to the specific arrangement and configuration of the two closure portions which provide an overlapped condition when mated together, to seal the bag mouth tightly.

More particularly, as shown especially clearly in FIG. 12, the bag mouth closure parts 120A and 120B are provided with a pair of foldable tabs such as 132 and 134 to which are sewn portions of the bag mouth; the downwardly-extending bottom ribs 130A and 130B are also sewn to the bag. The handle parts 122A and 122B are provided with interior openings 180 through which the fingers of the user's hand extend during removal and replacement of the bag; various strengthening ribs may be also employed in the handle, as indicated in the drawings.

Flange members 184A and 184B extend at right angles to the ribs 130A and 130B on each handle part, flange 184A having two portions 185A, 186B at slightly different heights; flange member 184B is the mirror-image of 184A (see FIG. 11), and consists of corresponding higher and lower flanges 185B and 186B. When the two handle parts are placed together as in FIG. 10, the higher flange portion of each handle part overlies the lower flange portion of the other handle part. By such overlapping, secure closure is achieved to prevent loss of collected grass when the two bag-mouth closure portions are placed together.

To support the bag-mouth closure, rear bag support 124 is mounted on, and extends between, the opposed arms 34 and 36. This support means provides an upwardly-facing channel 202 within which the two semi-cylindrical handle parts 122A and 122B fit closely when they are mated together in the closed position, as shown for example in FIG. 2. By grasping the two handle parts together in one hand, they can then be lifted vertically out of the support means, and replaced by subsequent downward vertical motion when the bag is to be reassembled on the mower.

In this example, the bag-mouth support means 124 comprises a convoluted rod, configured as shown for example in FIG. 8, to provide the horizontal upwardly-open receiving channel 202 for the handle. The two end legs 210 and 212 of the support means are held within respective clamps 214, 215 (FIG. 3) and secured by the pivot screws 41, 42 when the latter screws are tightened. Wing nuts 218 secured to the free, threaded ends of these screws enable easy loosening and tightening, in order to assemble the support rod to the handle arms, as well as to loosen this connection to fold up the handle system as described above. A set of four holes 219 are provided in each of the clamps, as shown in FIG. 2, so that the position of the support means can be varied by placing the screws 42 through different ones of the four holes, thereby to position the bag in exactly the desired location.

Accordingly, as indicated for example in FIGS. 6 and 7, the loaded grass bag can be removed from the mower by simple simultaneous lifting of the two handles 92 and 122, and then emptied by letting the mouth end of the bag hang downward over the location where dumping is desired; the mouth end will then fall open under the force of gravity to enable easy, automatic emptying of the bag. If desired, the front handle 92 and one half of the rear handle 122 may be held, and perhaps shaken, during such discharge. Easy replacement of the bag is accomplished by placing the two bag-mouth closure handle parts together and then moving the two handles downward to rest the handle ears in the channel of support means 124, and to connect bag inlet connector sealingly to the outlet of the discharge chute.

The specific embodiment shown in the drawings also enables ready conversion of the lawn mower to a side discharging configuration with no bag, merely by disassembly and removal of the chute as shown in FIG. 8 and replacing it with a cover plate (not shown). The mower may also be one which was designed for a side bag, but is converted to the rear bag arrangement of the preferred embodiment by removing the side chute and replacing it with the chute 16; in this case, to rigidify the mounting of the chute 16, the rod 60 is secured to the side of the chute, and provided with the the circular flange 62 inward of its end 250, whereby when end 250 is inserted through opening 252 on the mower deck, the flange provides additional support for the rearward end of the chute. The same bolts which hold this latter support may hold the eyelet 59 through which the pull rope extends.

There has therefore been provided a lawn mower assembly and bag support means therefore in which the bag can easily be removed and replaced by simultaneous vertical motion of two handles, without other operations or motions, while still providing the desired sealing of the bag inlet and discharge mouth when the bag is on the lawn mower, and while providing easy opening of the bag mouth when its contents are to be dumped.

While the invention has been described with reference to specific embodiments in the interest of complete definiteness, it will be understood that it may be embodied in a variety of forms diverse from those specifically shown and described, without departing from the spirit and scope of the invention.

What is claimed is:

1. In a lawn mower assembly comprising: a grass discharge outlet and a mower handle positioned rearward of said discharge outlet; a grass collection bag having a bag inlet for receiving material discharged from said grass discharge outlet and having an openable and closable mouth through which collected grass can be emptied; bag inlet connector means secured to said bag inlet for sealingly connecting said inlet to said discharge outlet to receive said discharged material therefrom when said mower is operating, said bag inlet connector means being disconnectable from said discharge outlet when said bag is to be removed from said mower; bag closure means secured to said bag outlet mouth for closing said bag mouth; and bag support means for removably supporting said bag closure means on said mower handle;

the improvement wherein said assembly comprises a bag-inlet handle secured to said bag inlet connector means and a mouth-closure handle secured to said bag closure means, said bag inlet connector means being removable from, and replaceable on, said discharge outlet, and said mouth-closure handle being removable from, and replaceable on, said mower solely by substantially vertical movement of said bag-inlet handle and said mouth-closure handle, and wherein said bag inlet connector means is adapted to slide vertically into and out of assembled position with said grass discharge outlet, and wherein said bag support means comprises channel means mounted on said mower handle and providing a directly-upwardly facing open-topped channel for supporting said bag closure means therein.

2. The assembly of claim 1, wherein said bag closure means comprises ear members extending laterally from each side of said bag closure means to support said bag closure means by resting in said channel.

3. The assembly of claim 2, wherein said bag closure handle is in two parts each extending along said channel when supported therein, one part secured to one portion of said bag mouth and the other secured to another portion of said bag mouth so that when said bag closure means is closed said handle parts are disposed against each other to form said bag closure handle.

4. The assembly of claim 3, wherein each of said handle part has at least one flange overlapping the other of said handle parts when they are placed together, to form a seal against egress of the contents of said bag.

5. The assembly of claim 4, wherein said handle parts are mirror images of each other, and each has a pair of horizontal flanges at different heights thereon, whereby the higher flange on each handle part overlies the lower flange on the other handle part when the two parts are assembled against each other.

6. The assembly of claim 3, wherein said bag closure handle is provided with an opening extending through it to accommodate the fingers of a user, and wherein said channel fits closely about said handle parts to hold them together when resting therein.

7. In a power lawn mower, comprising: a chassis, an engine, and a cutting blade all mounted on said chassis; a mower handle assembly secured to said chassis rearwardly of said cutting blade for manually controlling the operation of said mower; a discharge chute having an outlet opening for discharging rearwardly of said engine cuttings produced by said cutting blade; and a bag disposed rearwardly of said engine between said discharge outlet opening and said mower handle and having an inlet opening for receiving said cuttings; said bag having a manually closable and openable mouth opposite its inlet opening for retaining said cuttings when closed, and for permitting emptying of said bag when the bag is removed and opened:

a system for removably supporting one end of said bag on said mower handle and the other end of said bag on said chute outlet, comprising:

(a) a discharge chute outlet connector secured to, and substantially surrounding, said discharge outlet opening;

(b) a bag inlet connector secured to, and substantially surrounding, said bag inlet opening;

(c) a bag inlet handle secured to said bag inlet connector;

(d) said bag inlet connector and said chute outlet connector being configured and related so that they can be placed into operative sealed position by vertical downward motion of said bag inlet handle, and can be completely disconnected by vertical upward motion of said handle;

(e) bag mouth closure means secured to said bag mouth and manually operable to open and close said mouth;

(f) a bag mouth closure handle secured to said bag mouth closure means and manually operable between a closed and an open position thereof; and (g) bag mouth closure support means mounted on said mower handle for receiving and holding said bag mouth closure means in its closed position;

(h) said support means supporting said bag mouth closure means so that it can be moved clear of said support means by vertical upward lifting of said bag mouth closure handle;

(i) whereby said bag can be lifted from said mower by vertical upward lifting of said bag inlet handle and said bag mouth closure handle; and wherein said bag mouth closure means comprises ears extending laterally outwardly therefrom, and said support means provides an upwardly-open channel for receiving said ears to support said closure means.

8. The system of claim 7, wherein said bag closure means comprises a handle formed of two parts secured to different portion of said bag adjacent said bag mouth, so that said bag mouth is closed when said parts are assembled against each other, and said channel has a width to hold said handle parts to each other when they are resting in said channel.

9. The system of claim 8, wherein said handle parts have overlapping flange portions when placed together.

* * * * *